(12) United States Patent
Suzuki et al.

(10) Patent No.: US 12,316,226 B2
(45) Date of Patent: May 27, 2025

(54) POWER CONVERTER FOR ENABLING SIMULTANEOUS TRANSMISSION OF POWER BETWEEN MULTIPLE VOLTAGE PARTS

(71) Applicant: DENSO CORPORATION, Kariya (JP)

(72) Inventors: Yoshiki Suzuki, Kariya (JP); Keisuke Suzuki, Kariya (JP); Takumi Shimizu, Kariya (JP); Shuji Kurauchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 188 days.

(21) Appl. No.: 17/957,877

(22) Filed: Sep. 30, 2022

(65) Prior Publication Data

US 2023/0022784 A1  Jan. 26, 2023

Related U.S. Application Data

(63) Continuation of application No. PCT/JP2021/009262, filed on Mar. 9, 2021.

(30) Foreign Application Priority Data

Mar. 31, 2020 (JP) .................... 2020-063309

(51) Int. Cl.
*H02M 3/28* (2006.01)
*H02M 3/335* (2006.01)

(52) U.S. Cl.
CPC ....... *H02M 3/285* (2013.01); *H02M 3/33561* (2013.01); *H02M 3/33576* (2013.01)

(58) Field of Classification Search
CPC ............ H02M 3/22; H02M 3/24; H02M 3/28; H02M 3/285; H02M 3/315; H02M 3/335; H02M 3/33561; H02M 3/33569; H02M 3/33571; H02M 3/33573; H02M 3/33576; H02M 3/33584; H02M 3/33592; H02M 3/1584; H02M 3/11586; H02M 3/1588; H02M 1/0067; H02M 1/007; H02M 1/008; H02M 1/009; H02M 1/42–4216; H02M 1/4233–4275; H02M 7/66; H02M 7/68; H02M 7/72; H02M 7/757; H02M 7/79; H02M 7/797; Y02T 10/60; Y02T 10/70; B60L 53/00; B60L 53/14; B60L 53/20; B60L 53/22
USPC ......... 363/15–21.03, 34, 40–48, 65–72, 123, 363/124, 125–134; 323/247–254, 267, 323/351; 307/9.1, 10.1, 11, 17, 18, 19, 307/21, 22, 23, 25–29, 43, 64, 65, 66
See application file for complete search history.

(56) References Cited

U.S. PATENT DOCUMENTS

2012/0092903 A1  4/2012 Nania et al.

FOREIGN PATENT DOCUMENTS

JP  6140602 B2  5/2017

*Primary Examiner* — Thienvu V Tran
*Assistant Examiner* — Carlos O Rivera-Perez
(74) *Attorney, Agent, or Firm* — Oliff PLC (57) ABSTRACT

A power converter configured to be connected to three or more voltage parts, includes three or more power-conversion circuitries to be connected to respective ones of the three or more voltage parts, and a multi-port transformer connected to the three or more power-conversion circuitries at respectively different ports. The three or more voltage parts include a vehicle drive battery and a plurality of alternating-current (AC) voltage parts. Each of the plurality of AC voltage parts is configured to provide at least one of power input to a multi-port transformer side and power output from the multi-port transformer side.

3 Claims, 11 Drawing Sheets

POWER CONVERTER FOR ENABLING SIMULTANEOUS TRANSMISSION OF POWER BETWEEN MULTIPLE VOLTAGE PARTS

CROSS-REFERENCE TO RELATED APPLICATION

This application is a continuation application of International Application No. PCT/JP2021/009262 filed Mar. 9, 2021 which designated the U.S. and claims priority to Japanese Patent Application No. 2020-063309 filed Mar. 31, 2020, the contents of each of which are incorporated herein by reference.

BACKGROUND

Technical Field

This disclosure relates to a power converter.

Related Art

A power converter, provided with a first battery, a second battery, and AC power input/output terminals, is known that includes a transformer having three coils magnetically coupled to each other (hereinafter referred to as "multi-port transformer"). This power converter includes a pair of AC power input/output terminals allowing for input/output of AC power.

DESCRIPTION OF SPECIFIC EMBODIMENTS

The above known power converter, as disclosed in JP 6140602 B, is not capable of simultaneous input/output of AC power between a plurality of AC voltage parts.

In view of the foregoing, it is desired to have a power converter that enables simultaneous input/output of AC power between a plurality of AC voltage parts.

One aspect of the present disclosure provides a power converter configured to be connected to three or more voltage parts, includes three or more power-conversion circuitries to be connected to respective ones of the three or more voltage parts, and a multi-port transformer connected to the three or more power-conversion circuitries at respectively different ports.

The three or more voltage parts include a vehicle drive battery and a plurality of alternating-current (AC) voltage parts. Each of the plurality of AC voltage parts is configured to provide at least one of power input to a multi-port transformer side and power output from the multi-port transformer side.

This enables simultaneous input/output of AC power between the plurality of AC voltage parts ACS1 and ACS2 via the multi-port transformer 3.

As described above, the above aspect can provide a power converter that enables simultaneous input/output of AC power between a plurality of AC voltage parts.

First Embodiment

A power converter according to a first embodiment will now be described with reference to FIGS. 1 to 7.

Figure 1:
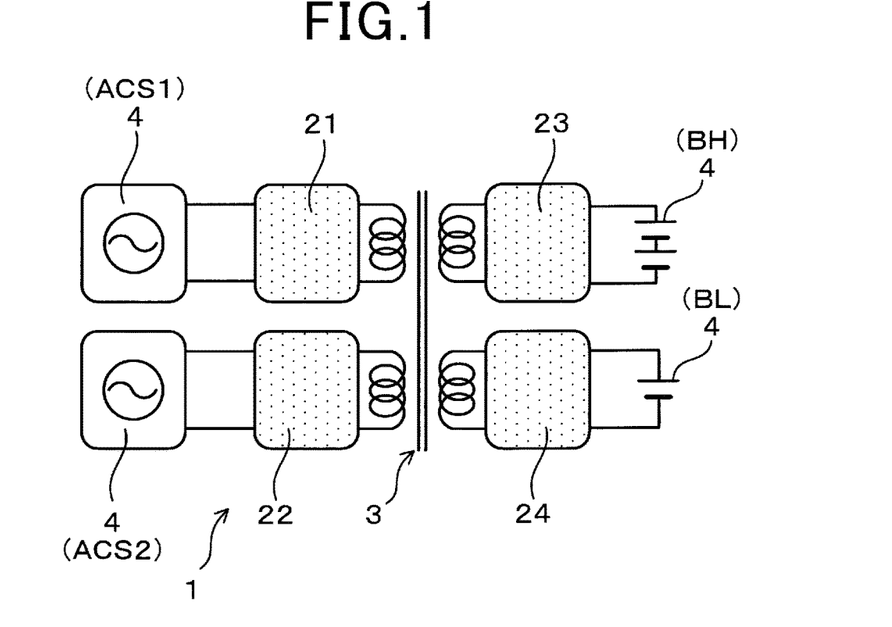
FIG. 1 is a circuit diagram of a power converter according to a first embodiment.

The power converter 1 of the present embodiment is a power converter connected to three or more voltage parts 4.

The power converter 1 includes three or more power converter circuitries 21, 22, 23, and 24, and a multi-port transformer 3.

The three or more power-conversion circuitries 21, 22, 23, and 24 are respectively connected to three or more voltage parts 4. The multi-port transformer 3 is connected to the three or more power-conversion circuitries 21, 22, 23 and 24 respectively at different ports. The three or more voltage parts 4 include a vehicle drive battery BH and a plurality of AC voltage parts ACS 1 and ACS2.

Each of the AC voltage parts ACS1 and ACS2 is configured to provide at least one of power input to the multi-port transformer 3 side and power output from the multi-port transformer 3 side. Here, the term "power input to the multi-port transformer 3 side" means power input to the multi-port transformer 3 via a certain one of the power-conversion circuitries. The term "power output from the multi-port transformer 3 side" means power output from the multi-port transformer 3 via a certain one of the power-conversion circuitries.

The power converter 1 of the present embodiment, as illustrated in FIG. 1, includes four power-conversion circuitries 21, 22, 23, and 24. The power converter 1 is connected to four voltage parts 4. Two of the four voltage parts are the AC voltage parts ACS1 and ACS2. The power converter 1 is connected to the vehicle drive battery BH that is one of the four voltage parts 4. The power converter 1 of the present embodiment is connected to an energy storage device BL that is the other one of the four voltage parts 4.

The vehicle drive battery BH is mounted to a vehicle, such as an electric vehicle or a hybrid vehicle, and is capable of storing and outputting power for driving the vehicle. The vehicle drive battery BH is a battery with a higher voltage than the energy storage device BL, for example, of 200V or higher. In the following, the vehicle drive battery BH is also referred to as a high-voltage battery BH.

Each of the AC voltage parts ACS1 and ACS2 is configured, as described above, to provide at least one of power input to the multi-port transformer 3 side and power output from the multi-port transformer 3 side. Each of the AC voltage parts ACS1 and ACS2 may be, for example, a power supply part for supplying power from outside the vehicle to the other voltage part 4 (e.g., a high-voltage battery BH) connected to the multi-port transformer 3. Each of the AC voltage parts ACS1 and ACS2 may be, for example, a power output part that outputs power from the other AC voltage part 4 connected to the multi-port transformer 3 as AC power. Each of the AC voltage parts ACS1 and ACS2 may have both functions as the power supply part and the power output part as described above. The power supply part may be assumed to be an AC charger, such as a charging station. The power output part may be provided with, for example, an AC output port. The AC output port may be provided with a relay operable to switch between energization and interruption.

The energy storage device BL may be an auxiliary battery mounted to the vehicle. The voltage of the energy storage device BL may be, for example, 12V. However, alternatively, the voltage of the energy storage device BL may be, for example, 7V, 48V, or the like. The energy storage device BL may be formed of a capacitor or the like.

A plurality of energy storage devices may be connected to the power converter 1, as described later. In such an embodiment, for example, the plurality of energy storage devices may be of the same voltage or of different voltages from each other. For example, the voltage of one of the energy storage devices, BL1, may be 12V and the voltage of the other of the energy storage devices, BL2, may be a voltage other than or equal to 12V.

The power converter 1 is mounted to the vehicle, such as an electric vehicle or a hybrid vehicle. The high-voltage battery BH and the energy storage device BL are also mounted to the vehicle together with the power converter 1.

The multi-port transformer 3 includes four coils that are magnetically coupled to each other. Each of the four power-conversion circuitries 21, 22, 23, and 24 is connected to both terminals of a corresponding one of the four coils.

The AC voltage part ACS1 that is configured to provide at least power input to the multi-port transformer 3 side, and the AC voltage part ACS2 that is configured to provide at least power output from the multi-port transformer 3 side, as the plurality of AC voltage parts, are connected to the power converter 1 of the present embodiment.

In such a configuration, the AC voltage part ACS1 may be, for example, an AC power source, such as a charger, and the AC voltage part ACS2 may be, for example, an AC output port (e.g., an in-vehicle outlet or the like). Each of the AC voltage parts ACS1 and ACS2 may be configured to provide both power input to and output power from the multi-port transformer 3 side.

Each of the power-conversion circuitries 21, 22, 23, and 24 may include a plurality of power-conversion elements. Each power-conversion element may be a switching element, such as a metal-oxide semiconductor field-effect transistor (MOSFET), an insulated gate bipolar transistor (IGBT), or a diode with a switching function. In the following, the power-conversion circuitries 21, 22, 23, and 24 are also referred to as switching circuitries, as appropriate.

Figure 2:
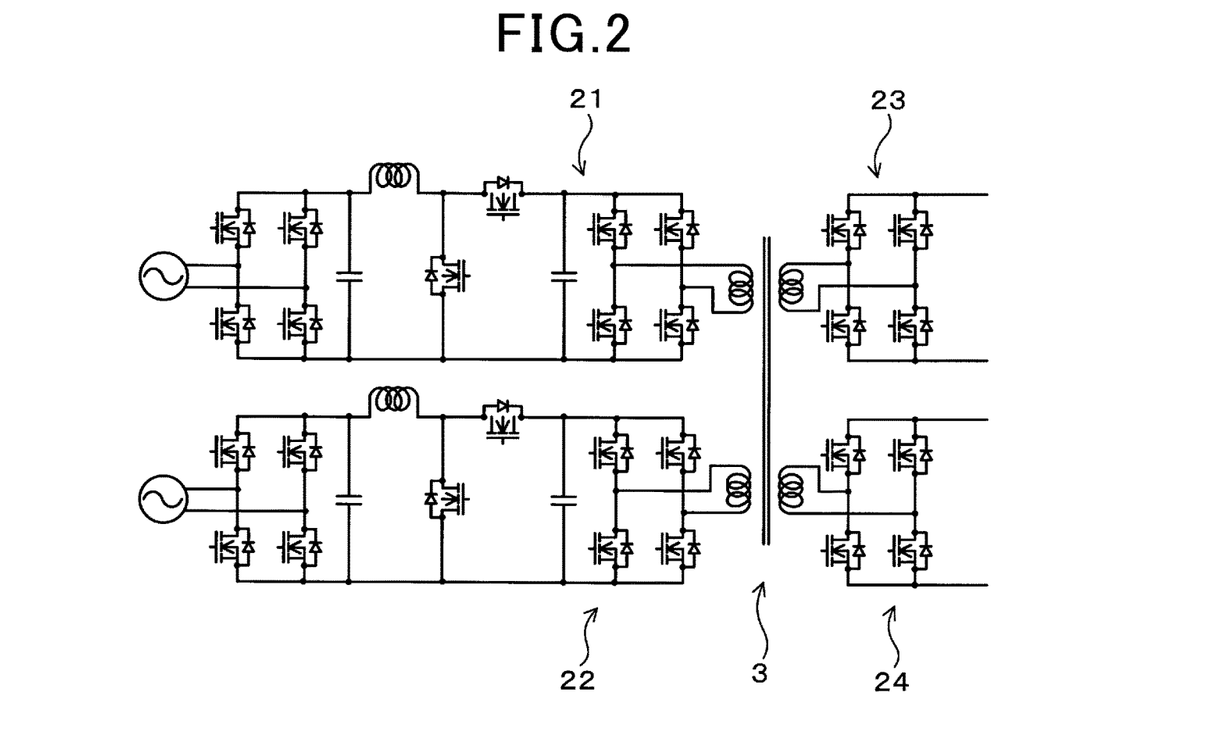
FIG. 2 is an example circuit diagram of a multi-port transformer and three power conversion circuits according to the first embodiment.

As illustrated in FIG. 2, each of the switching circuitries 21, 22, 23, and 24 has a bridge circuit configuration. That is, in the power converter 1 of the present embodiment, the multi-port transformer 3 and the four switching circuitries 21, 22, 23, and 24 form an MAB, where MAB is an abbreviation for Multiple Active Bridge.

For example, as illustrated in FIG. 2, each of the switching circuitries 21, 22, 23, and 24 may have a full-bridge circuit configuration. Each of the switching circuitries 21 and 22 connected to the AC voltage parts ACS1 and ACS2, respectively, may include two full-bridge circuits. That is, each of the switching circuitries 21 and 22 may be configured to convert AC power to DC power in one of the two full-bridge circuits and then convert DC power to AC power in the other of the two full-bridge circuits. Each of the switching circuitries 21 and 22 may include a power factor correction circuit (i.e., PFC circuit) between the two full-bridge circuits. In such a configuration, switching control in each of the switching circuitries 21 and 22 enables power conversion to AC power at a desired effective voltage or power conversion to AC power at a desired frequency.

In some alternative embodiments, at least some of the full-bridge circuits in these switching circuitries 21, 22, 23, and 24 may be replaced with half-bridge circuits as appropriate.

Figure 3:
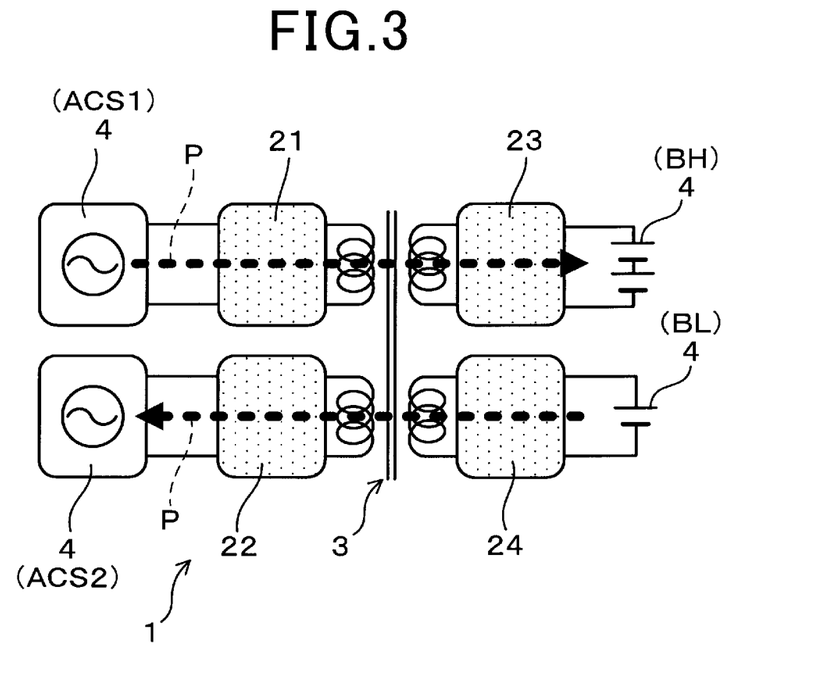
FIG. 3 is an illustration of an example operation of the power converter according to the first embodiment, where charging and outputting are performed simultaneously.
Figure 4:
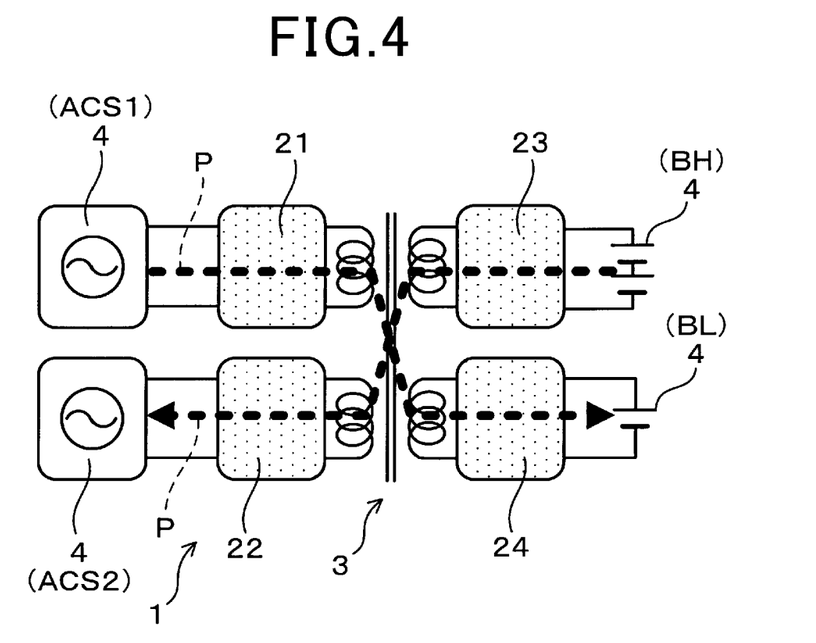
FIG. 4 is an illustration of another example operation of the power converter according to the first embodiment, where charging and outputting are performed simultaneously.

In the present embodiment, power conversion may be performed between the AC voltage part ACS1, the AC voltage part ACS2, the high-voltage battery BH, and the energy storage device BL. For example, as illustrated in FIG. 3, power may be supplied from the energy storage device BL to the AC voltage part ACS2 while charging the high-voltage battery BH from the AC voltage part ACS1. For example, as illustrated in FIG. 4, power may be supplied from the high-voltage battery BH to the AC voltage part ACS2 while charging the energy storage device BL from the AC voltage part ACS1. In FIGS. 3 and 4, power transfer is indicated by the dashed arrows P. This is also true for the same type of figures described later.

Figure 5:
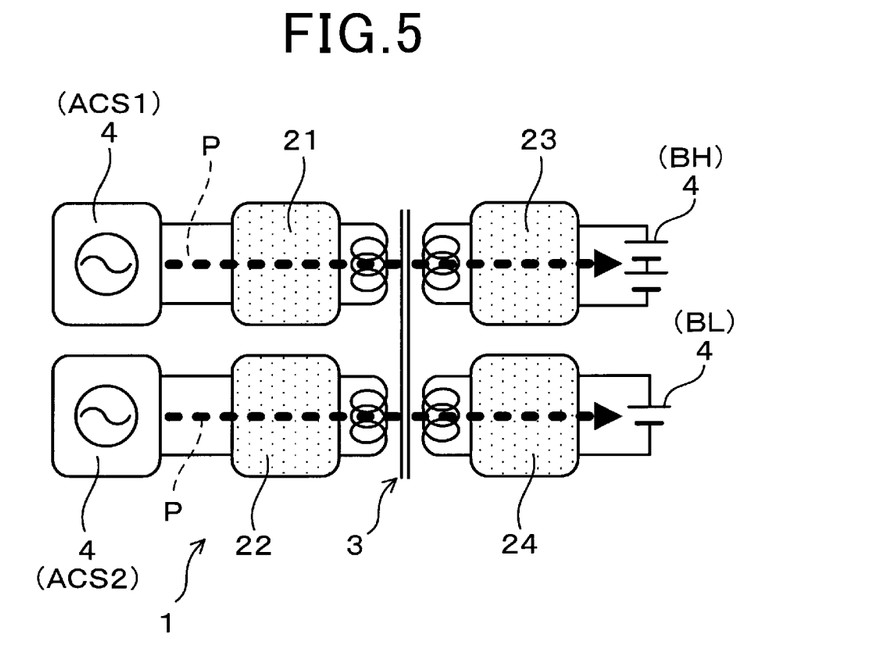
FIG. 5 is an illustration of an example operation of the power converter according to the first embodiment, where a high-voltage battery and a storage device are charged simultaneously.
Figure 6:
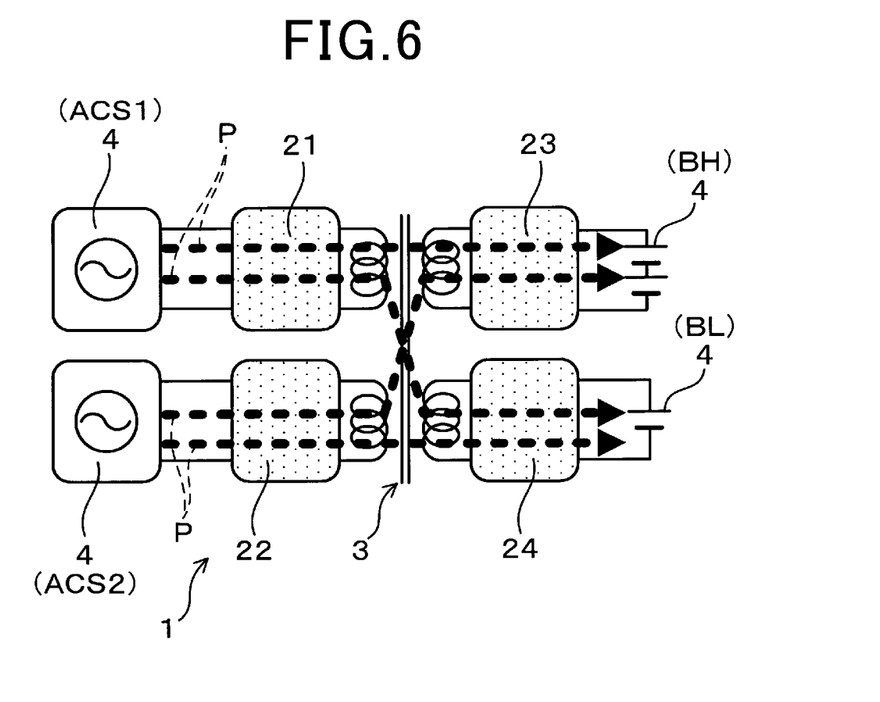
FIG. 6 is an illustration of another example operation of the power converter according to the first embodiment, where a high-voltage battery and a storage device are charged simultaneously.

AC power may be supplied from both the AC voltage parts ACS1 and ACS2. In such a case, for example, as illustrated in FIG. 5, power may be supplied from the AC voltage part ACS2 to the energy storage device BL while charging the high-voltage battery BH from the AC voltage part ACS1. For example, as shown in FIG. 6, the two AC voltage parts ACS1 and ACS2 may simultaneously charge at least one of the high-voltage battery BH and the energy storage device BL.

Figure 7:
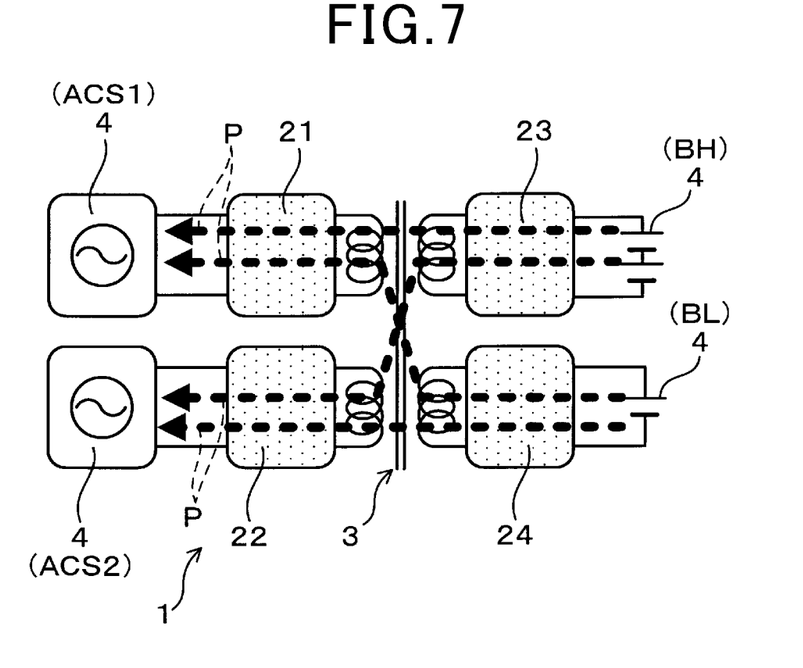
FIG. 7 is an illustration of still another example operation of the power converter according to the first embodiment, where a high-voltage battery and a storage device are charged simultaneously.

Power may be output from the multi-port transformer 3 side to both the two AC voltage parts ACS1 and ACS2. In such a case, for example, as illustrated in FIG. 7, power from at least one of the high-voltage battery BH and the energy storage device BL may be output as AC power to the two AC voltage parts ACS1 and ACS2 simultaneously.

Power conversion between the above four voltage parts 4 may be implemented with a single compact multi-port transformer 3 and small-scale switching circuitries 21, 22, 23, and 24. Here, the term "small-scale" includes a small number of components or a small overall body size.

In the above power converter 1, the three or more voltage parts 4 include the vehicle drive battery BH and the plurality of AC voltage parts ACS1 and ACS2. Each of the AC voltage parts ACS1 and ACS2 is configured to provide at least one of power input to the multi-port transformer 3 side and power output from the multi-port transformer 3 side. This enables simultaneous input/output of AC power between the plurality of AC voltage parts ACS1 and ACS2 via the multi-port transformer 3.

The term "input/output" means at least one of input and output. That is, as described above, simultaneous input of AC power from the plurality of AC voltage parts, simultaneous output of AC power to the plurality of AC voltage parts, or input of AC power from some of the AC voltage parts while outputting AC power to the others of the AC voltage parts. The term "simultaneous" means overlap of at least some of time periods.

One of the AC voltage parts, ACS1, is configured to provide at least power input to the multi-port transformer 3 side. The other of the AC voltage parts, ACS2, is configured to provide at least power output from the multi-port transformer 3 side. As described above, this enables output of AC power to one of the AC voltage parts, ACS2, while inputting AC power from the other of the AC voltage parts, ACS1.

Therefore, for example, power of the energy storage device BL or the like may be output from the AC output port as the AC voltage part ACS2 while charging the high-voltage battery BH. Such a function is expected to be in demand, for example, in the following situation. That is, for example, it is assumed that a cabin of the vehicle being charged is used as a kind of living space. In such a situation, it is conceivable that electrical equipment, such as home appliances, is used in the cabin. Then, it is desirable to have a function that allows use of electrical equipment while charging the high-voltage battery BH in the vehicle. Installation of the power converter 1 of the present embodiment in a vehicle can implement the above function.

The energy storage device BL is connected to some of the power-converter circuitries, 24. This facilitates, for example, transfer of power between the AC voltage parts ACS1 and ACS2 and the storage device BL. For example, the storage device BL may be charged from the AC voltage part ACS1 or the like.

As described above, the present embodiment provides a power converter that enables simultaneous input/output of AC power between a plurality of AC voltage parts.

Second Embodiment

Figure 8:
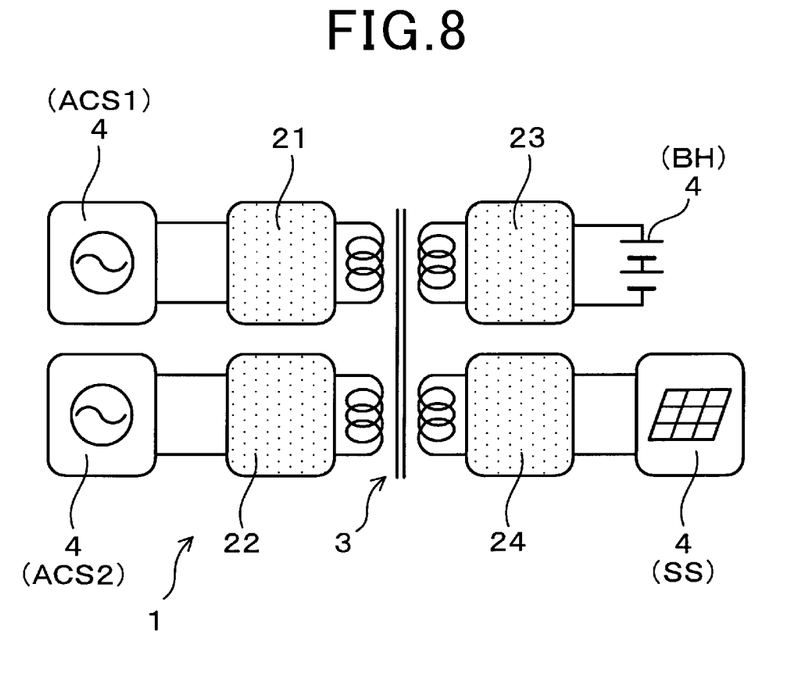
FIG. 8 is a circuit diagram of a power converter according to a second embodiment.
Figure 9:
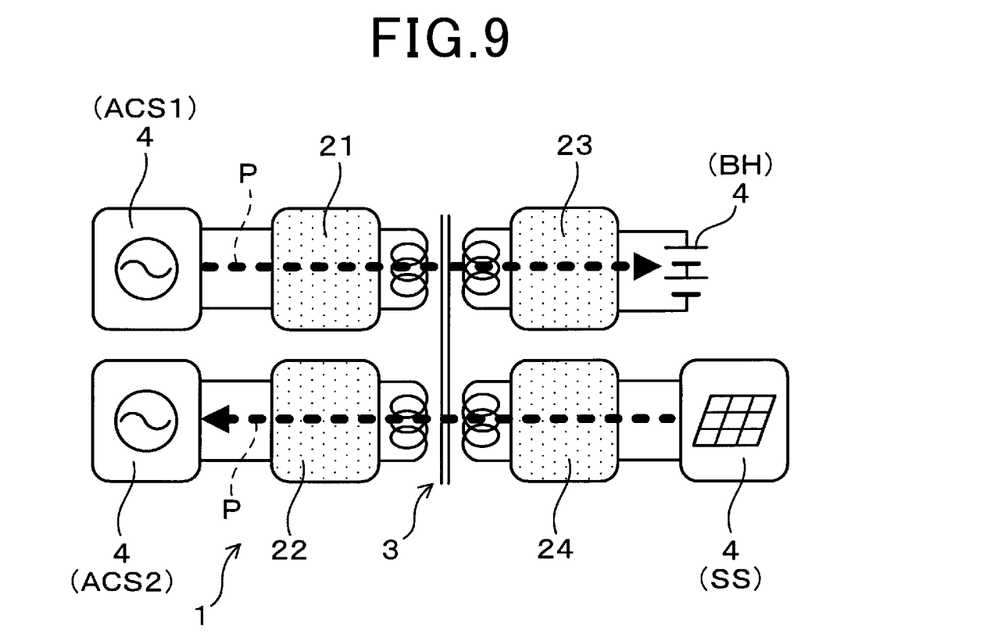
FIG. 9 is an illustration of an example operation of the power converter according to the second embodiment.

In a second embodiment, as illustrated in FIGS. 8 and 9, a power converter 1 is connected to a photovoltaic source SS as one of voltage parts 4.

That is, the power converter 1 of the present embodiment is connected to two AC voltage parts ACS1 and ACS2, a high-voltage battery BH, and a photovoltaic power supply SS, as voltage parts 4.

The photovoltaic source SS is a type of power supply part for supplying power to the high-voltage battery BH from outside the vehicle. For example, the photovoltaic source SS may be a photovoltaic generator including a solar panel disposed on the ceiling of the vehicle or the like. The photovoltaic source SS may be a photovoltaic generator with a maximum power point tracking (MPPT) function. The photovoltaic source SS may also be a photovoltaic generator with a pulse width modulation (PWM) control function.

Because the photovoltaic source SS has limited availability conditions, such as time of day and weather, such a power source is often used in conjunction with other types of power sources. Therefore, allowing the photovoltaic source SS to be connected to a plurality of other voltage parts 4 via a single multi-port transformer 3 can reduce the number of components and the overall body size on the whole system, such as a vehicle power supply system.

The others are the same as in the first embodiment. The same reference numerals used in the second and subsequent embodiments as those used in the previous embodiments represent the same components as in the previous embodiments, unless otherwise indicated.

In the present embodiment, for example, AC output of power from the photovoltaic source SS may be provided during charging of the high-voltage battery BH. That is, for example, as illustrated in FIG. 9, power may be output from the photovoltaic source SS to the AC voltage part ACS2 while charging the high-voltage battery BH from the AC voltage part ACS1.

Other effects are the same as those of the first embodiment.

Third Embodiment

Figure 10:
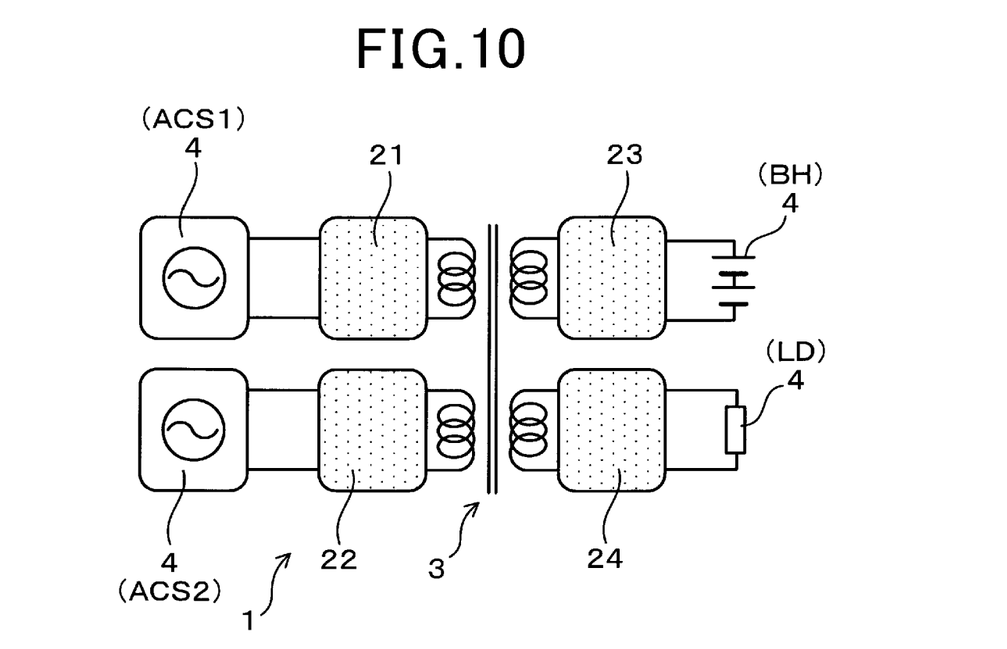
FIG. 10 is a circuit diagram of a power converter according to a third embodiment.
Figure 11:
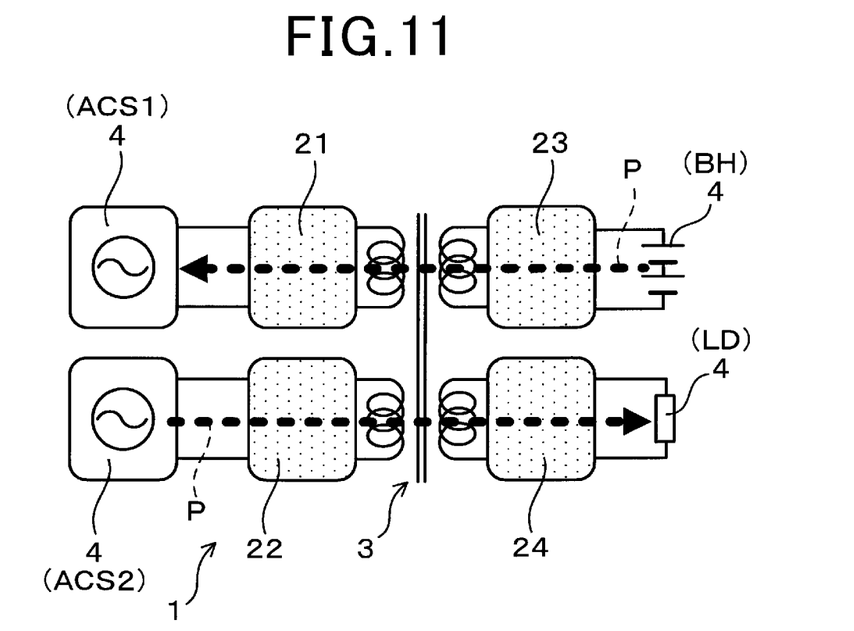
FIG. 11 is an illustration of an example operation of the power converter according to the third embodiment.

In a third embodiment, as illustrated in FIGS. 10 and 11, a power converter 1 is connected to a load LD as one of voltage parts 4.

That is, the power converter 1 of the present embodiment is connected to two AC voltage parts ACS1 and ACS2, a high-voltage battery BH, and the load LD, as voltage parts 4.

The load LD may be, for example, mounted to the vehicle. The load LD may include, for example, heaters. The heaters include a heater for heating an electrically heated catalyst provided in the exhaust system of a hybrid vehicle or the like. The heaters include heaters for heating seats, and a heater for heating a battery, such as the high-voltage battery BH. The heater may include a water heater for heating cooling water of the high-voltage battery. Besides the heaters, the load LD may include, for example, an active body control (e.g., air suspension), an electric supercharger, an engine cooling fan, an air conditioner compressor, and the like. The voltage of the load LD may be higher than the voltage of the energy storage device BL. The voltage of the load LD may be higher than the voltage of the high-voltage battery BH.

The others are the same as in the first embodiment.

In the present embodiment, for example, external power may be used to energize the load LD, such as heaters, during power supply from the high-voltage battery BH to outside the vehicle. That is, for example, as illustrated in FIG. 11, power may be supplied from the AC voltage part ACS2 to the load LD while supplying power from the high-voltage battery BH to the AC voltage part ACS 1. In this case, for example, the AC voltage part ACS1 is a so-called V2H device, which may be configured to supply vehicle power to a house. V2H stands for Vehicle to Home. Power may be supplied from an external feeder as the AC voltage part ACS2 to the load LD, such as on-board heaters, while supplying power from the vehicle to the house.

Figure 12:
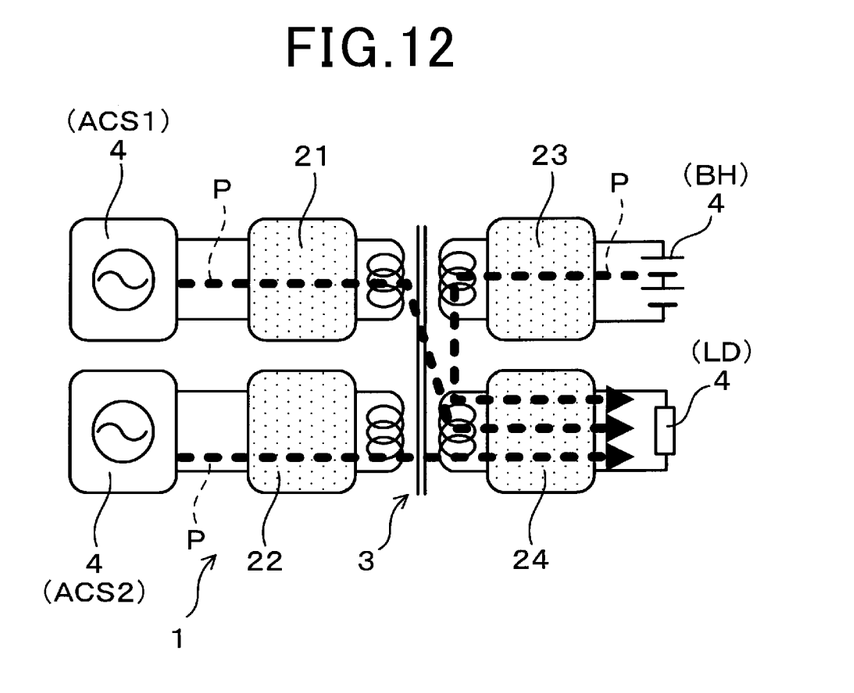
FIG. 12 is an illustration of another example operation of the power converter according to the third embodiment.

For example, as illustrated in FIG. 12, power may be supplied from the two AC voltage parts ACS1 and ACS2 to the load LD simultaneously. Furthermore, simultaneously with power supply from the two AC voltage parts ACS1 and ACS2, power may be supplied from the high-voltage battery BH to the load LD.

Other effects are the same as those of the first embodiment.

Fourth Embodiment

Figure 13:
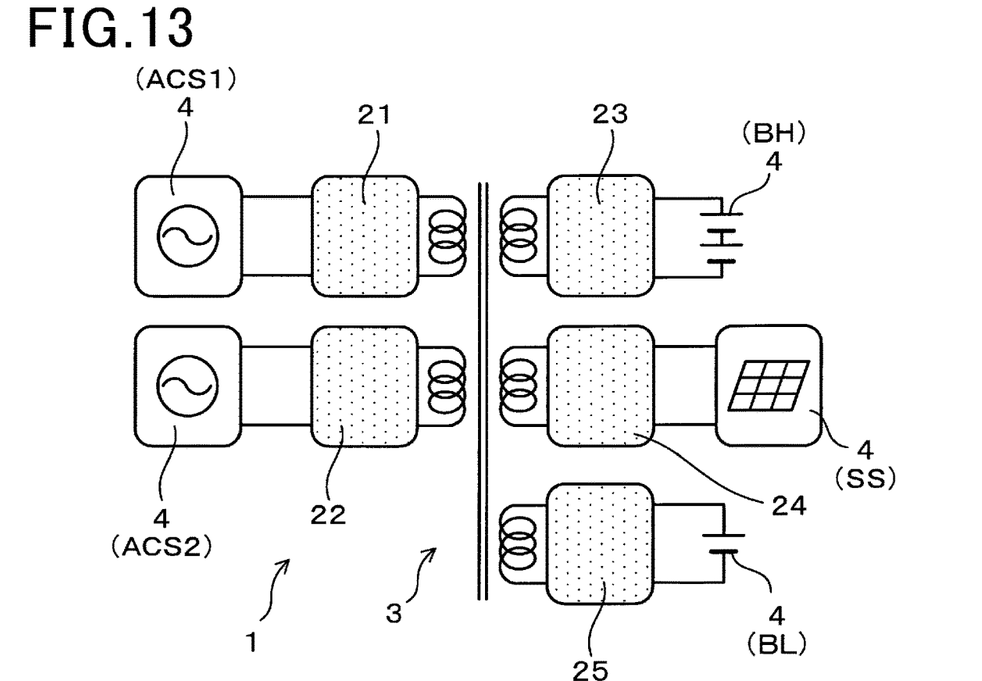
FIG. 13 is a circuit diagram of a power converter according to a fourth embodiment.
Figure 14:
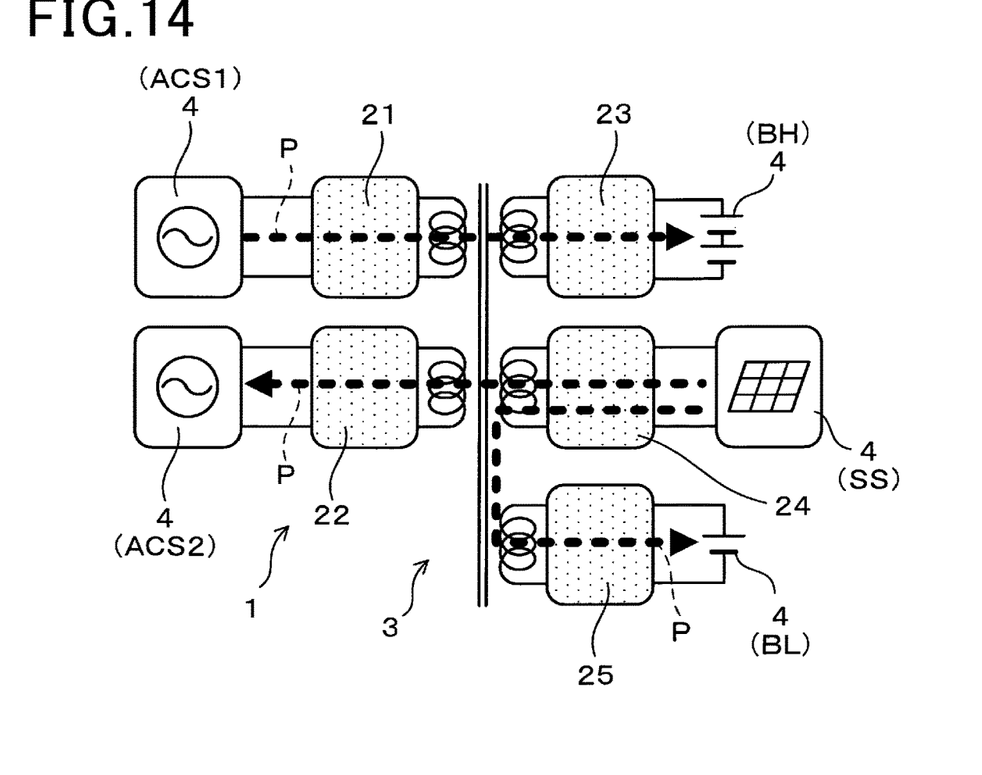
FIG. 14 is an illustration of an example operation of the power converter according to the fourth embodiment.

In a fourth embodiment, as illustrated in FIGS. 13 and 14, a power converter 1 connects five voltage parts 4.

The power converter 1 of the present embodiment is connected to two AC voltage parts ACS1 and ACS2, a high-voltage battery BH, a photovoltaic source SS, and an energy storage device BL.

In the power converter 1 of the present embodiment, the multi-port transformer 3 is provided with five ports. The power conversion device 1 includes five switching circuitries 21, 22, 23, and 24, and 25 connected to the respective ports. The five voltage parts 4 are connected to the respective switching circuitries 21, 22, 23, and 24, and 25.

The others are the same as in the first embodiment.

In the present embodiment, for example, as illustrated in FIG. 14, power may be output from the photovoltaic source SS to the AC voltage part ACS2 while charging the high-voltage battery BH from the AC voltage part ACS1. Furthermore, a surplus amount of power generated by the photovoltaic source SS may be charged to the storage device BL while charging the high-voltage battery BH and outputting power to the AC voltage part ACS2.

Other effects are the same as those of the first embodiment.

Fifth Embodiment

Figure 15:
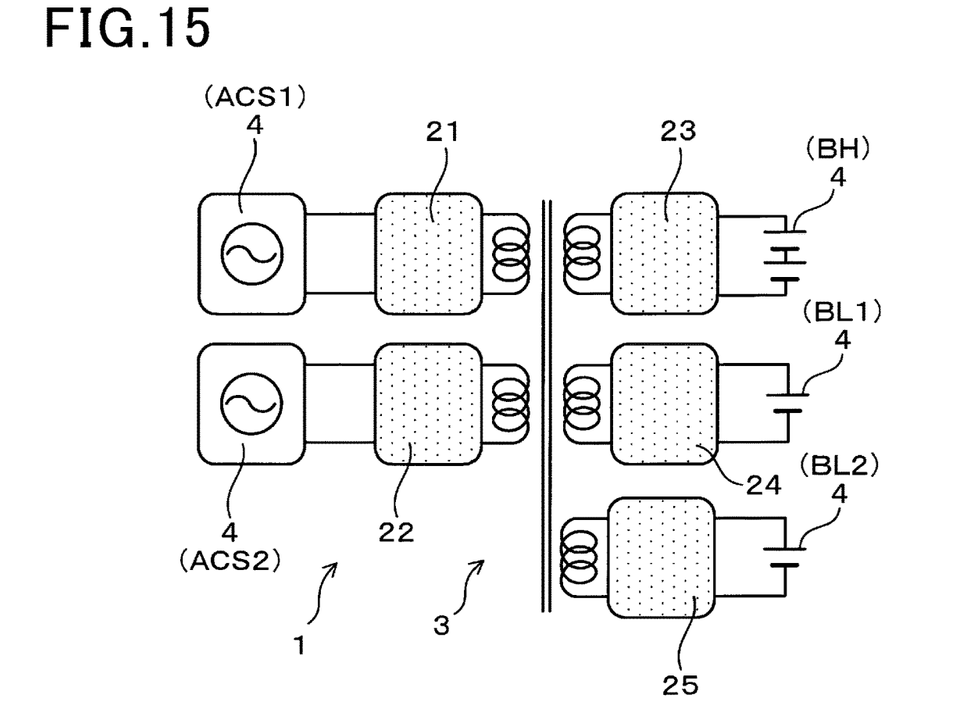
FIG. 15 is a circuit diagram of a power converter according to a fifth embodiment.
Figure 16:
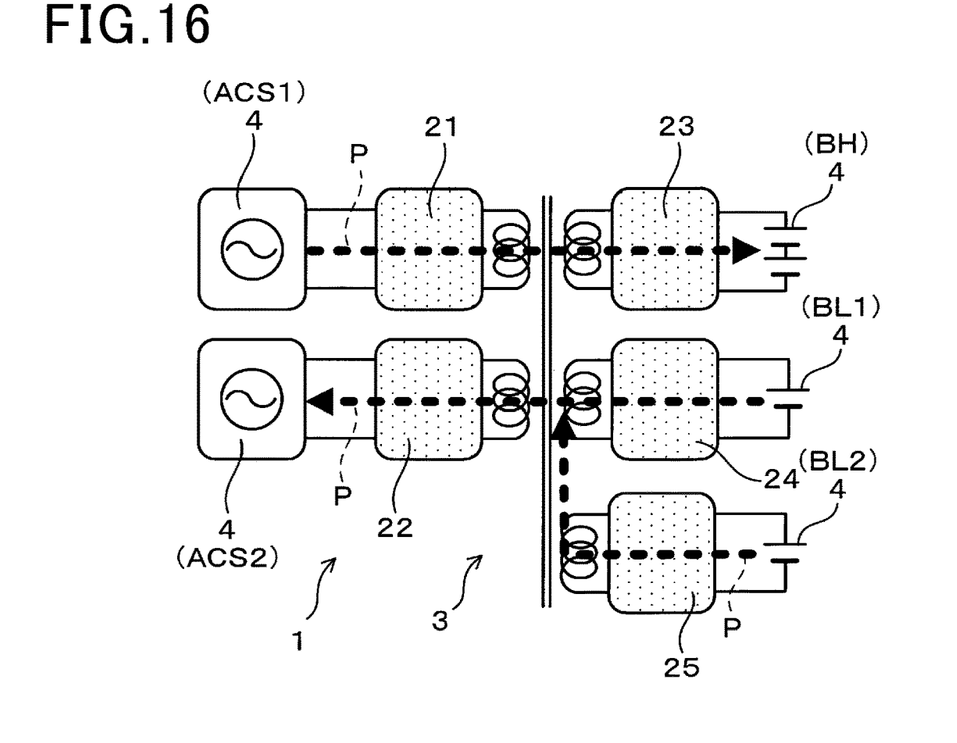
FIG. 16 is an illustration of an example operation of the power converter according to the fifth embodiment.

In a fifth embodiment, as illustrated in FIGS. 15 and 16, a power converter 1 connects five voltage parts 4.

The power converter 1 of the present embodiment is connected to two AC voltage parts ACS1 and ACS2, a high-voltage battery BH, and two energy storage devices BL1 and BL2, as voltage parts. Each of the energy storage devices BL1 and BL2 may have the same configuration and the same function, as the energy storage device BL described above.

In the present embodiment, the energy storage devices BL1 and BL2 may be different in voltage from each other. The energy storage device BL1 and the energy storage device BL2 may have the same voltage as each other. For example, one of the energy storage devices, BL1, may be an energy storage device in the 12V system. The other energy storage device BL2 may be an energy storage device in a different voltage system (e.g., 48V system, 7V system or the like), or may be an energy storage device in the 12V system.

The others are the same as in the first embodiment.

In the present embodiment, for example, as illustrated in FIG. 16, power may be output from the energy storage device BL1 and the energy storage device BL2 to the AC voltage part ACS2 while charging the high-voltage battery BH from the AC voltage part ACS1. Then, power arbitration may be performed between the energy storage devices BL1 and BL 2 during charging of the high-voltage battery BH. For example, whichever has relatively more energy storage margin of the energy storage device BL1 and the energy storage device BL2 may be selected, and power may be output from the selected energy storage device to the AC voltage part ACS2.

Other effects are the same as those of the first embodiment.

Sixth Embodiment

Figure 17:
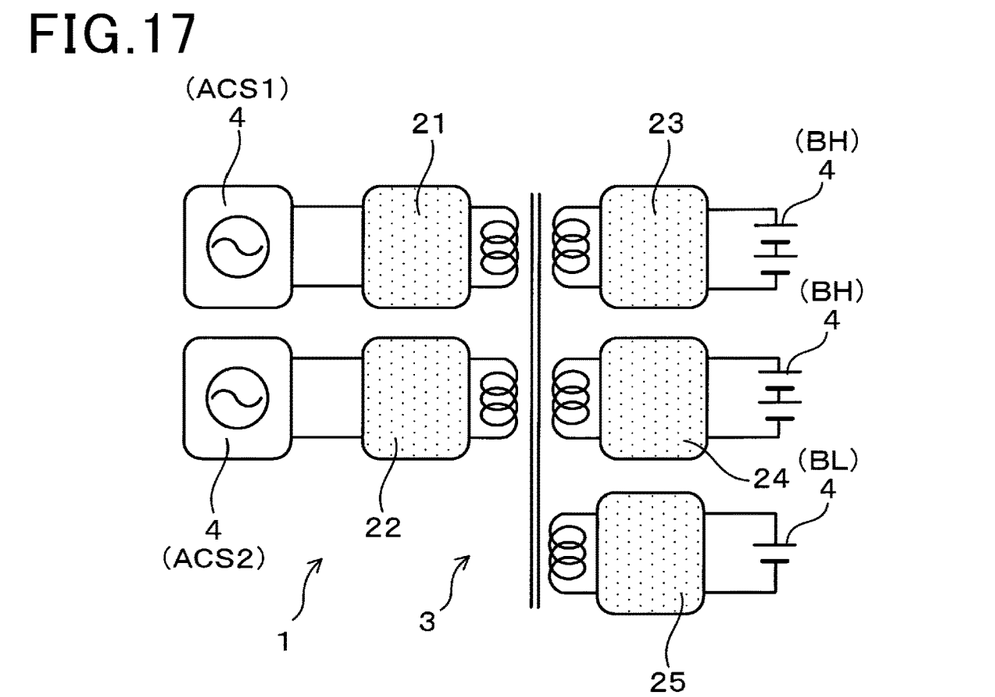
FIG. 17 is a circuit diagram of a power converter according to a sixth embodiment.
Figure 18:
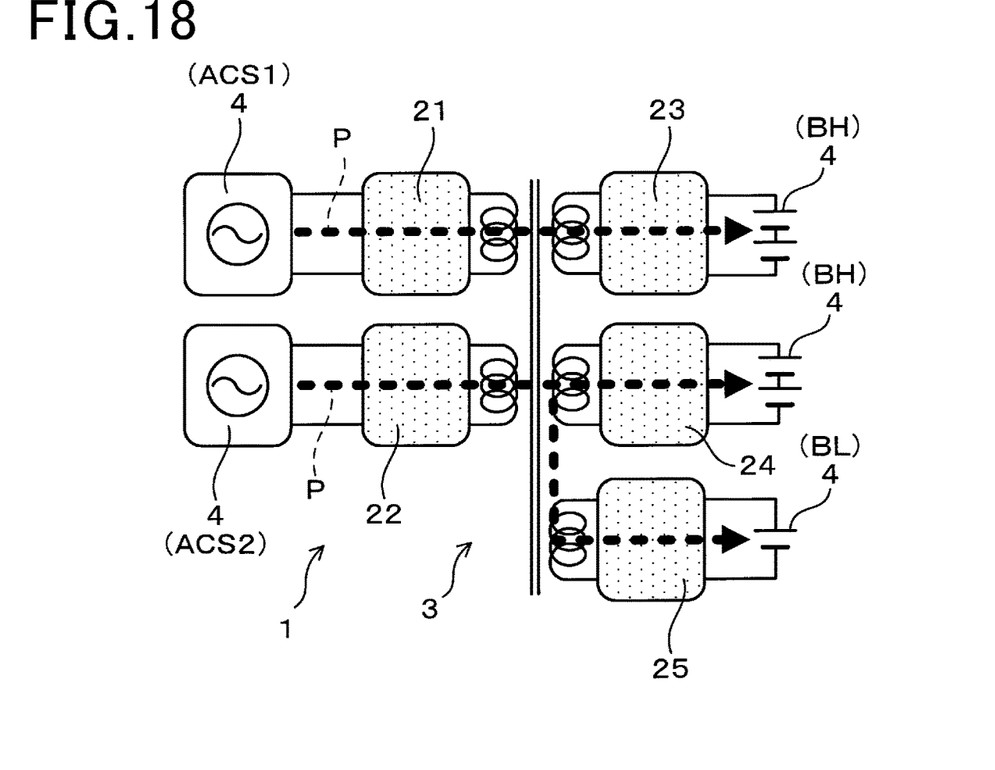
FIG. 18 is an illustration of an example operation of the power converter according to the sixth embodiment.

In a sixth embodiment, as illustrated in FIGS. 17 and 18, AC voltage parts 4 connected to a power converter 1 include a plurality of high-voltage batteries BH.

The power converter 1 of the present embodiment is connected to two AC voltage parts ACS1 and ACS2, two high-voltage batteries BH, and one energy storage device BL.

The two high-voltage batteries BH may be connected in series with each other, for example, when in use (i.e., when driving the vehicle) or during DC quick charging. One of the two high-voltage batteries BH may be used as a backup battery.

The others are the same as in the first embodiment.

In the present embodiment, for example, as illustrated in FIG. 18, one of the high-voltage batteries BH may be charged from the AC voltage part ACS2 while the other of the high-voltage batteries BH is charged from the AC voltage part ACS1. This allows the high-voltage batteries BH to be charged in a short time. The energy storage device BL may be charged while the two high-voltage batteries BH are being charged. Although not illustrated, for example, AC power may be output from one of the AC voltage parts, ACS2, using one of the high-voltage batteries BH while the other of the high-voltage batteries BH is charged from the other of the AC voltage parts, ACS1. In this case, power may be output from the AC voltage part ACS2 together with power output from the storage device BL or charging of the storage device BL.

Other effects are the same as those of the first embodiment.

Seventh Embodiment

Figure 19:
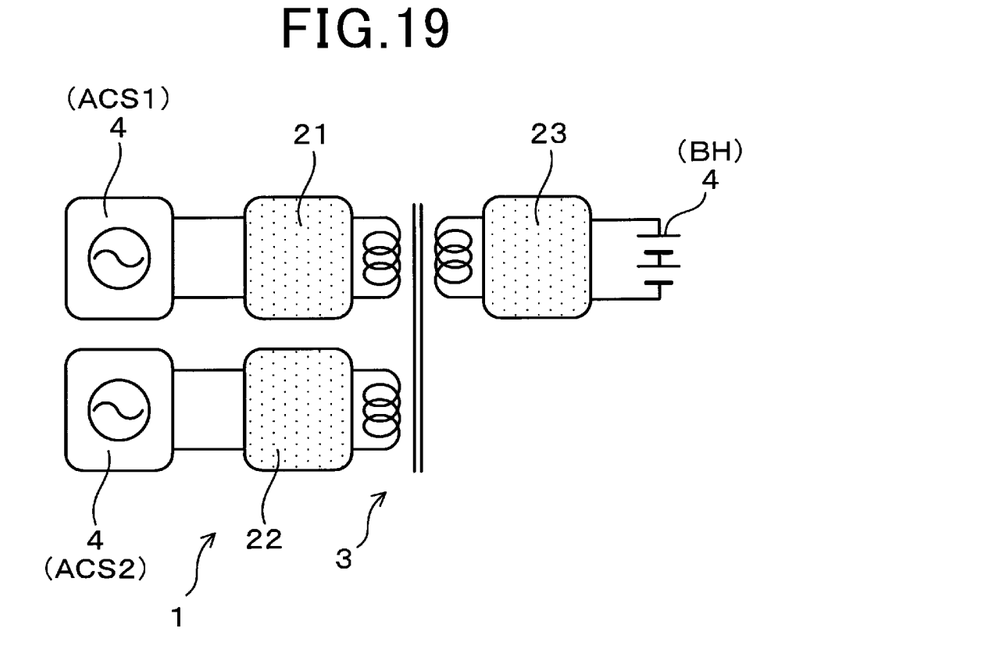
FIG. 19 is a circuit diagram of a power converter according to a seventh embodiment.
Figure 20:
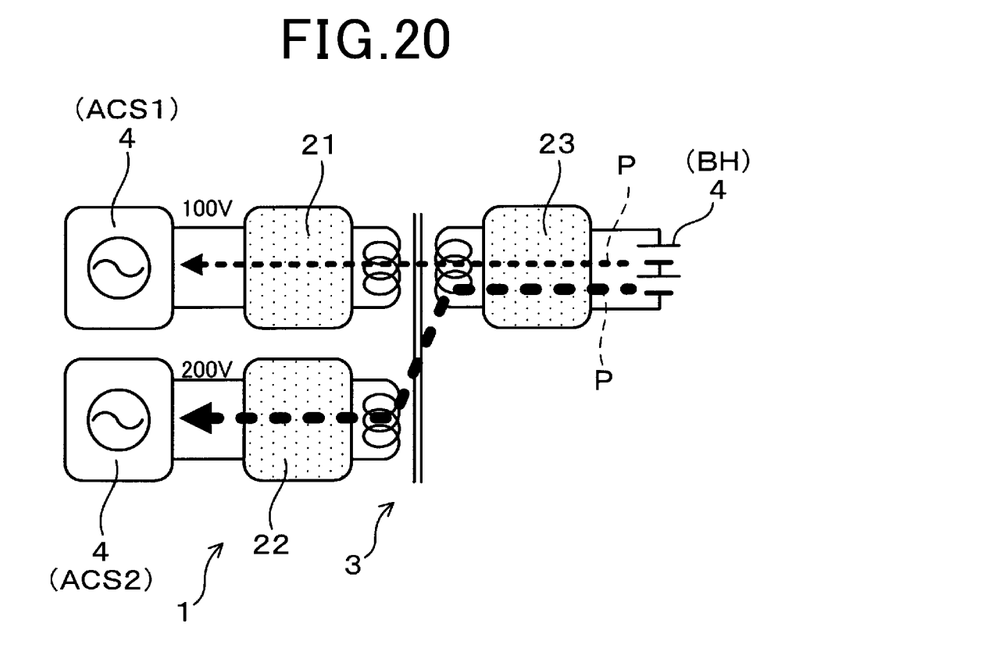
FIG. 20 is an illustration of an example operation of the power converter according to the seventh embodiment.

In a seventh embodiment, as illustrated in FIGS. 19 and 20, a plurality of AC voltage parts include two AC voltage parts ACS1 and ACS2 having different effective voltages from each other.

The power converter 1 of the present embodiment is connected to the two AC voltage parts ACS1 and ACS2, and a high-voltage battery BH, as voltage parts 4.

For example, the effective voltage of the AC voltage part ACS1 is 100V and the effective voltage of the AC voltage part ACS2 is 200V. Both the two AC voltage parts may be AC output parts. That is, for example, the AC voltage part ACS1 may be an in-vehicle outlet, and the AC voltage part ACS2 may be a V2H device.

The others are the same as in the first embodiment.

In the present embodiment, for example, as illustrated in FIG. 20, power of the high-voltage battery BH may be output from the AC voltage part ACS1 and the AC voltage part ACS2 at respectively different voltages (e.g., effective voltages 100V and 200V). This allows for, for example, AC power supply to a house at 200V via the V2H device while using AC100V home appliances in the cabin of the vehicle.

Although not illustrated, for example, the AC voltage part ACS2 may be an AC charger. In this case, AC power may be output from the AC voltage part ACS1 to use home appliances and the like while charging the high-voltage battery BH from the AC voltage part ACS2.

Other effects are the same as those of the first embodiment.

Eighth Embodiment

Figure 21:
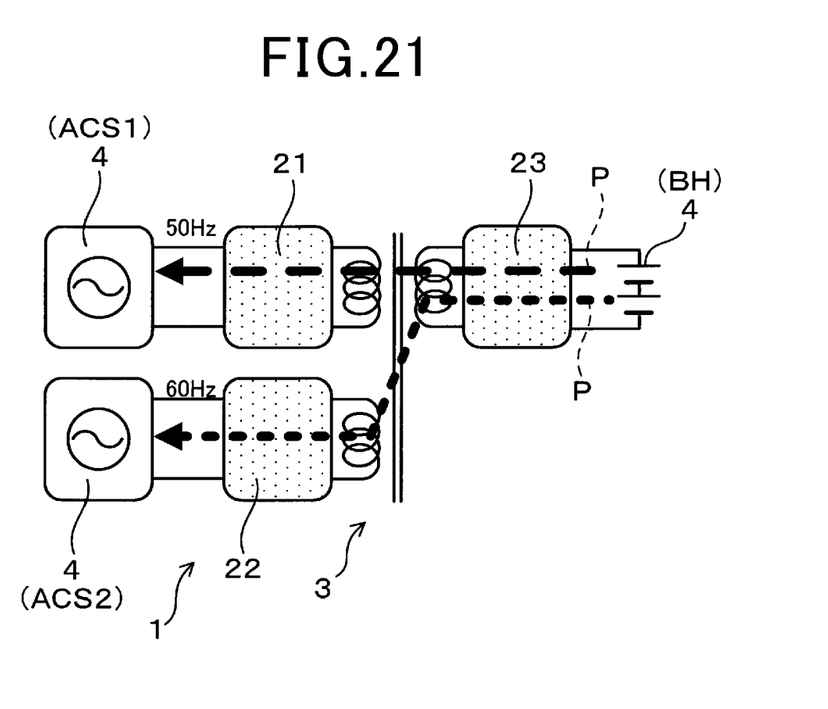
FIG. 21 is an illustration of an example operation of a power converter according to an eighth embodiment.

In an eighth embodiment, as illustrated in FIG. 21, a plurality of AC voltage parts include two AC voltage parts ACS1 and ACS2 having different frequencies from each other.

The power converter 1 of the present embodiment is connected to the two AC voltage parts ACS1 and ACS2 and a high-voltage battery BH, as the voltage parts 4.

For example, the frequency of the AC voltage part ACS1 is 50 Hz and the frequency of the AC voltage part ACS2 is 60 Hz. Each of the two AC voltage parts ACS1 and ACS2 may be an AC output part. That is, for example, each of the two AC voltage parts ACS1 and ACS2 may be an in-vehicle outlet.

The others are the same as in the first embodiment.

In the present embodiment, for example, as illustrated in FIG. 21, power of the high-voltage battery BH may be output from the two AC voltage parts ACS1 and ACS2 at respectively different frequencies (e.g., 50 Hz and 60 Hz). This allows for, for example, simultaneous use of home appliances at different frequencies in the cabin of the vehicle.

Other effects are the same as those of the first embodiment.

Although the specific embodiments of the present disclosure have been described above, the present disclosure is not limited to the embodiments described above, and may be implemented in various variations. The above embodiments may be combined with each other as appropriate.

In each of the embodiments described above, some of the possible effects of the embodiment have been described, but other effects may be provided in addition to these effects described above. Each embodiment can provide various effects that can be derived from the entirety of this specification and the accompanying drawings.

The power converter may be configured to be connected to three or more AC voltage parts.

In each of the above embodiments, the switching circuitries (i.e., power-conversion circuitries) are directly connected to the voltage parts. Alternatively, a PFC circuit (i.e., power factor correction circuit) may be interposed between the switching circuitries and the voltage parts.

Relays may be interposed in the positive and negative wirings between the switching circuitry (i.e., power-converter circuitry) and the load or energy storage device. The relays may be, for example, mechanical or semiconductor relays. Alternatively, a power-off mechanism having an equivalent function to these relays may be provided in place of the relays.

A DC power source may be connected to the power converter 1 as a type of voltage part 4.

The DC power source is a kind of power supply part for supplying power to the high-voltage battery from outside the vehicle. The DC power source may be a charging power source capable of charging with DC power. For example, a DC charger, such as a charging station, may be assumed as the DC power source.

The present invention is not limited to any one of the above-described embodiments and can be applied to various embodiments without departing from the principles and spirit of the present disclosure.

While the disclosure has been described in accordance with the embodiments, it is understood that the disclosure is not limited to such embodiments or structures. The disclosure also encompasses various modifications and variations within the scope of equivalence. Furthermore, various combinations and modes, as well as other combinations and modes including only one element, more or less, thereof, are also within the scope and idea of the disclosure.

What is claimed is:

1. A power converter to be mounted to a vehicle and configured to be connected to three or more voltage parts, the power converter comprising:

three or more power-conversion circuitries to be connected to respective ones of the three or more voltage parts; and a multi-port transformer connected to the three or more power-conversion circuitries at respectively different ports, wherein the three or more voltage parts include a vehicle drive battery and a plurality of alternating-current (AC) voltage parts, and each of the plurality of AC voltage parts is configured to provide at least one of power input to a multi-port transformer side and power output from the multi-port transformer side, wherein the plurality of AC voltage parts include a first AC voltage part and a second AC voltage part having different effective voltages from each other, the power output from the first AC voltage part is configured to provide power output to the second AC voltage part via the multi-port transformer while charging the vehicle drive battery, and the second AC voltage part is an AC output port provided in a cabin of the vehicle.

2. The power converter according to claim 1, wherein the plurality of AC voltage parts include two AC voltage parts having different frequencies from each other.

3. The power converter according to claim 1, wherein the three or more power-conversion circuitries comprise four or more power-conversion circuitries, and each of at least one of the four or more power-conversion circuitries is to be connected to an energy storage device as one of the three or more voltage parts.

* * * * *